(12) United States Patent
Dennis et al.

(10) Patent No.: US 12,172,894 B1
(45) Date of Patent: *Dec. 24, 2024

(54) SYSTEMS AND METHODS FOR PRODUCING SYNTHESIS GAS

(71) Applicant: Board of Regents of the University of Texas System, Austin, TX (US)

(72) Inventors: Brian H. Dennis, Austin, TX (US); Frederick M. MacDonnell, Austin, TX (US)

(73) Assignee: Board of Regents of the University of Texas System

( * ) Notice: Subject to any disclaimer, the term of this patent is extended or adjusted under 35 U.S.C. 154(b) by 721 days.

This patent is subject to a terminal disclaimer.

(21) Appl. No.: 17/315,263

(22) Filed: May 7, 2021

Related U.S. Application Data

(63) Continuation-in-part of application No. 17/290,583, filed as application No. PCT/US2019/058916 on Oct. 30, 2019.

(Continued)

(51) Int. Cl.
*C01B 3/38* (2006.01)
*B01J 19/00* (2006.01)

(Continued)

(52) U.S. Cl.
CPC ........... *C01B 3/382* (2013.01); *B01J 19/0013* (2013.01); *B01J 19/245* (2013.01); *B01J 21/12* (2013.01); *B01J 23/755* (2013.01); *C01B 3/386* (2013.01); *C01B 3/40* (2013.01); *C01B 3/48* (2013.01); *B01J 2219/00063* (2013.01); *B01J 2219/00067* (2013.01); *B01J 2219/00081* (2013.01); *B01J 2219/00135* (2013.01); *B01J 2219/00164* (2013.01); *B01J 2219/00186* (2013.01); *C01B 2203/0233* (2013.01); *C01B 2203/0261* (2013.01); *C01B 2203/0283* (2013.01); *C01B 2203/0833* (2013.01); *C01B 2203/085* (2013.01); *C01B 2203/1058* (2013.01);

(Continued)

(58) Field of Classification Search
CPC .......... C01B 3/382; C01B 3/386; C01B 3/40; C01B 3/48; C01B 2203/0233; C01B 2203/0261; C01B 2203/0283; C01B 2203/0833; C01B 2203/085; C01B 2203/1058; C01B 2203/1082; C01B 2203/1241; C01B 2203/1288; C01B 2203/1619; B01J 19/0013; B01J 19/245; B01J 21/12; B01J 23/755; B01J 2219/00063; B01J 2219/00067; B01J 2219/00081; B01J 2219/00135; B01J 2219/00164; B01J 2219/00186
See application file for complete search history.

(56) References Cited

U.S. PATENT DOCUMENTS

2007/0217989 A1* 9/2007 Malhotra ................. B01J 8/067
423/437.1

* cited by examiner

*Primary Examiner* — Andrew J. Oyer
(74) *Attorney, Agent, or Firm* — AdamsIP, LLC; Stephen Thompson; J. Hunter Adams

(57) ABSTRACT

System and methods for producing synthesis gas are provided. The system includes a reactor and a steam generation system designed to provide precise control of the rate of steam generation to mix steam with fuel gas to produce humidified fuel gas, which is then fed into a combustion chamber of the reactor. The molar ratio of hydrogen to carbon monoxide in the synthesis gas output from the reactor may be accurately controlled by adjusting the humidity of the fuel gas input into the combustion chamber.

20 Claims, 5 Drawing Sheets

Related U.S. Application Data

(60) Provisional application No. 62/752,439, filed on Oct. 30, 2018.

(51) Int. Cl.
*B01J 19/24* (2006.01)
*B01J 21/12* (2006.01)
*B01J 23/755* (2006.01)
*C01B 3/40* (2006.01)
*C01B 3/48* (2006.01)

(52) U.S. Cl.
CPC ................ *C01B 2203/1082* (2013.01); *C01B 2203/1241* (2013.01); *C01B 2203/1288* (2013.01); *C01B 2203/1619* (2013.01)

SYSTEMS AND METHODS FOR PRODUCING SYNTHESIS GAS

CROSS-REFERENCE TO RELATED APPLICATIONS

This application is a continuation-in-part application of co-pending U.S. patent application Ser. No. 17/290,583, filed on Apr. 30, 2021, which is a U.S. National Stage application of PCT Application Number PCT/US19/58916, filed on Oct. 30, 2019, which claims priority to U.S. Provisional Application No. 62/752,439, filed on Oct. 30, 2018, which applications are hereby incorporated by reference herein in their entirety.

FIELD OF THE DISCLOSURE

The subject matter of the present disclosure refers generally to systems and methods for producing synthesis gas.

BACKGROUND

Synthesis gas, or syngas, is a gas mixture primarily comprising hydrogen ($H_2$) and carbon monoxide (CO). Syngas is typically a product of gasification and can be used in various applications, including electricity generation and liquid fuel production.

It is often desirable to produce syngas having a particular $H_2$:CO molar ratio. For example, an $H_2$:CO molar ratio of around 2:1 is typically considered desirable for liquid fuel production. It can be difficult, however, to consistently achieve a desired $H_2$:CO molar ratio given the various parameters involved in the process. Accordingly, it would be desirable to have systems and methods for producing syngas with which a desired $H_2$:CO molar ratio can be achieved with greater precision and consistency.

SUMMARY

In one aspect, a method of producing synthesis gas is provided. The method comprises generating steam and mixing the steam with a fuel gas, which is preferably natural gas, to produce humidified fuel and then combusting the humidified fuel and oxygen within a combustion chamber of a reactor to produce synthesis gas comprising hydrogen and carbon monoxide. Steam is generated utilizing a steam generation system designed to provide a precisely controlled rate of steam generation to mix the steam with the fuel gas to produce the humidified fuel gas. The molar ratio of hydrogen to carbon monoxide in the synthesis gas may be accurately controlled by precisely controlling the ratio of steam to fuel within the humidified fuel.

In one embodiment, the steam generation system comprises an electric heater, a water pump, and a control system comprising a controller and a sensor. The electric heater comprises a heating element disposed vertically within a pressure vessel, and the control system is configured to control a water level within the pressure vessel. Steam may be generated using the electric heater by operating the water pump to continuously pump water into a bottom end of the pressure vessel, supplying power to the heating element such that a free surface is formed within the pressure vessel between a liquid water phase and a saturated steam phase, and then outputting steam from the pressure vessel. The rate of steam generation from the pressure vessel may be controlled by controlling the water level in the pressure vessel, which may be controlled by adjusting the power supplied to the heating element. The steam may be superheated by a portion of the vertical heating element that is disposed above the free surface within the pressure vessel. The steam output from the pressure vessel is then mixed with the fuel gas, which is delivered at a controlled flow rate, to produce humidified fuel having a controlled ratio of steam to fuel.

In a preferred embodiment, the sensor is a temperature sensor positioned to measure a steam temperature of the steam output from the pressure vessel. Alternatively the sensor may be a level sensor positioned to measure the water level within the pressure vessel. The controller is configured to receive input from the temperature sensor or from the level sensor and, based on the input, to control the water level in the pressure vessel by adjusting the power supplied to the heating element. In a preferred embodiment, the water pump is a positive displacement pump that continuously cycles and that outputs a defined volume of water with each cycle. Thus, the pump provides an accurate and consistent flow rate, which can be set at a desired, known rate by setting the pump at a constant speed. Thus, by maintaining a constant water level in the pressure vessel, the rate of steam generation can be precisely and consistently controlled at a known rate based on the speed setting of the pump.

In another embodiment, the steam generation system may comprise a heat exchanger, a water pump, and a control system comprising a controller and a sensor. The heat exchanger comprises a vertically oriented shell and a plurality of tubes disposed within the shell, and the control system is configured to control a water level within the shell of the heat exchanger. Steam may be generated using the heat exchanger by operating the water pump to continuously pump water into a bottom end of the shell of the heat exchanger, flowing a heated fluid through the tubes of the heat exchanger such that a free surface is formed on the shell side between a liquid water phase and a saturated steam phase, and outputting steam from the shell of the heat exchanger. The rate of steam generation from the heat exchanger may be controlled by controlling the water level in the shell, which may be controlled by adjusting the flow rate of the heated fluid through the tubes of the heat exchanger. The steam output from the heat exchanger is then mixed with the fuel gas, which is delivered at a controlled flow rate, to produce humidified fuel having a controlled ratio of steam to fuel. In a preferred embodiment, the water pump is a positive displacement pump, and the sensor is a temperature sensor, or alternatively a level sensor. In the same manner, the controller may be used to control the water level in the pressure vessel by adjusting the power supplied to the heating element based on input from one of the sensors. In a preferred embodiment, the heated fluid that flows through the tubes of the heat exchanger comprises the synthesis gas produced within the reactor. Thus, waste heat from the process may be utilized to generate the steam required to produce the humidified fuel.

In a preferred embodiment, the reactor further comprises a catalyst chamber coupled to the combustion chamber. The combustion reactants from the combustion chamber may react with a catalyst contained within the catalyst chamber to generate a gas mixture of hydrogen, carbon monoxide, unreacted methane, carbon dioxide, and water. In a preferred embodiment, the catalyst chamber includes a catalyst comprising nickel on an alumina-silica support.

In another embodiment, the steam generation system comprises a boiler and a water pump. Steam may be generated using the boiler by operating the water pump to continuously pump water to the boiler, boiling the water in the boiler to generate steam, and outputting the steam from the boiler. The rate of steam generation from the boiler may be controlled by controlling a water flow rate continuously discharged from the pump to the boiler. The water pump is preferably a positive displacement pump, and the water flow rate may be controlled at a constant rate by adjusting the speed of the pump. The steam output from the boiler may then be mixed with fuel gas delivered at a controlled flow rate to produce humidified fuel having a controlled ratio of steam to fuel. In this embodiment, all of the water pumped to the boiler may be vaporized to generate steam. An additional heater may optionally be utilized downstream of the boiler to superheat the steam.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have systems and methods for producing synthesis gas ("syngas") with which a desired hydrogen to carbon monoxide ($H_2$:CO) molar ratio, or syngas molar ratio, can be achieved with greater precision and consistency. Disclosed herein are examples of such systems and methods. In one embodiment, a system for producing syngas provides for precisely control of the amount of water provided to a reactor of the system. This water is heated to create steam that is mixed with fuel, such as natural gas, to generate a humidified fuel that, along with oxygen, can be provided to the reactor for combustion and chemical transformation into syngas. By precisely controlling the amount of water used in the reaction, the $H_2$:CO molar ratio can be controlled with greater precision and consistency. The system includes a steam generation system designed to generate steam at a precise and consistent rate for mixing with the fuel. In some embodiments, the humidified fuel is provided to the reactor at a temperature above the dew point but below the boiling point (e.g., 100° C.) of water. In some embodiments, $H_2$:CO molar ratios in the range of approximately 1.6:1 to 3:1 can be achieved.

In the following disclosure, various specific embodiments are described. It is to be understood that those embodiments are example implementations of the disclosed inventions and that alternative embodiments are possible. Such alternative embodiments include hybrid embodiments that combine features of different embodiments. All such embodiments are intended to fall within the scope of this disclosure.

Disclosed herein is a continuous process for producing syngas. As used herein, the terms "synthesis gas" and "syngas" refer to gas mixtures primarily comprising $H_2$ and CO. Such gas mixtures can also comprise other components, such as methane ($CH_4$), carbon dioxide ($CO_2$), and water ($H_2O$). Oxygen ($O_2$) gas and a humidified fuel, such as humidified natural gas, are continuously input into the system. As used herein, "oxygen gas" includes pure oxygen gas as well as gas that primarily comprises oxygen (at least 70% oxygen) but also includes one or more other types of gas, such as nitrogen. For example, the oxygen gas may comprise up to approximately 15% nitrogen by mole, which enables more economical generation of oxygen gas via air separation. The $H_2$:CO molar ratio is controlled by changing the amount of water used in the system and, more particularly, the fuel humidity. Increased humidity results in increased $H_2$:CO molar ratios. The process can generate molar ratios from 1.6:1 to 3:1. Other known syngas production systems generally utilize semi-batch boiler systems for steam production that do not provide a consistently accurate flow rate of steam, thereby limiting the effectiveness of control of the syngas molar ratio.

Figure 1:
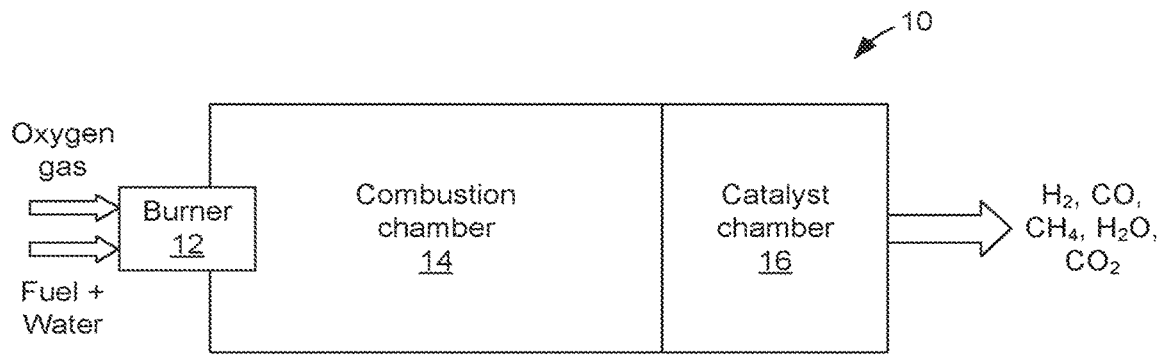
FIG. 1 is a schematic diagram of an embodiment of a syngas reactor.

FIG. 1 schematically illustrates a syngas reactor (or "reformer") 10 that can be used within a system for producing synthesis gas. The reactor 10 generally comprises a burner 12, a combustion chamber 14, and a catalyst chamber 16 that are arranged in series. The syngas production system can also include upstream components for preparing the reactants and downstream components for cooling the product gases, which are not identified in FIG. 1. The burner 12 is configured to combust the reactants (oxygen gas and the humidified fuel) within the combustion chamber 14 before they reach the catalyst chamber 16, in which they react with a catalyst contained therein to generate a gas mixture of $H_2$, CO, $CH_4$, $CO_2$, and $H_2O$. The composition of this gas mixture depends upon the burner design and the ratios of $O_2$ and $H_2O$ flow rates to fuel flow rate. In some embodiments, the volume flow ratio of oxygen gas to humidified fuel is in the range of approximately 0.5:1 to 0.6:1 to ensure that only a portion of the fuel product is reacted.

The reaction within the reactor 10 is exothermic and results in a significant temperature increase in the product gases as compared to the temperature of the incoming reactants. In some embodiments, the hot gases enter the catalyst chamber 16 at a temperature of approximately 900° C. to 1,300° C. In some embodiments, the catalyst comprises nickel (Ni) in an amount of approximately 7% to 9% by weight loading on an alumina-silica support. An example alumina-silica composition is identified in Table 1 below.

TABLE 1

Chemical composition of the alumina-silica catalyst support. mass %

| Alumina | Silica | Ferric Oxide | Titanium dioxide | Calcium Oxide | Magnesium Oxide | Alkalies (Na$_2$O & K$_2$O) |
|---|---|---|---|---|---|---|
| 41.5 | 55.6 | 0.9 | 1.0 | 0.1 | 0.1 | 0.8 |

Syngas comprising $H_2$, CO, $CH_4$, $CO_2$, and $H_2O$ with a desired $H_2$:CO molar ratio exits the catalyst chamber 16. In some embodiments, the exiting syngas can have a temperature of approximately 600° C. to 1,000° C., but preferentially above 800° C.

Figure 2:
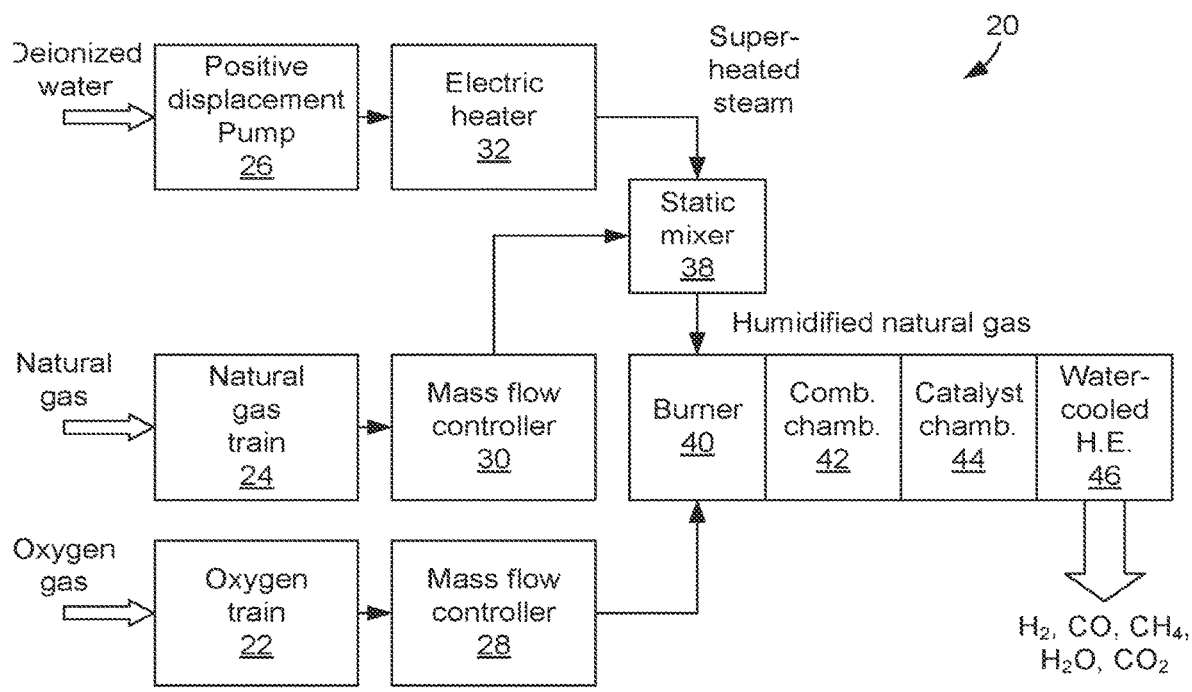
FIG. 2 is a schematic diagram of prototype system for producing syngas.

FIG. 2 illustrates a prototype syngas production system 20 of the type described above that was constructed and operated to evaluate the effect of water on the syngas production process. As shown in FIG. 2, the system 20 comprised an oxygen train 22 that received oxygen gas, a natural gas train 24 that received natural gas, and a water pump 26 that received deionized water. The trains 22, 24 comprise supply systems including various pipes, valves, and pressure regulators that are used to control the flow and delivery of gas in industrial systems. Downstream of both the oxygen train 22 and the natural gas train 24 were separate mass flow controllers 28 and 30 that respectively controlled the flow of oxygen gas and natural gas to the remainder of the system 20.

Figure 3:
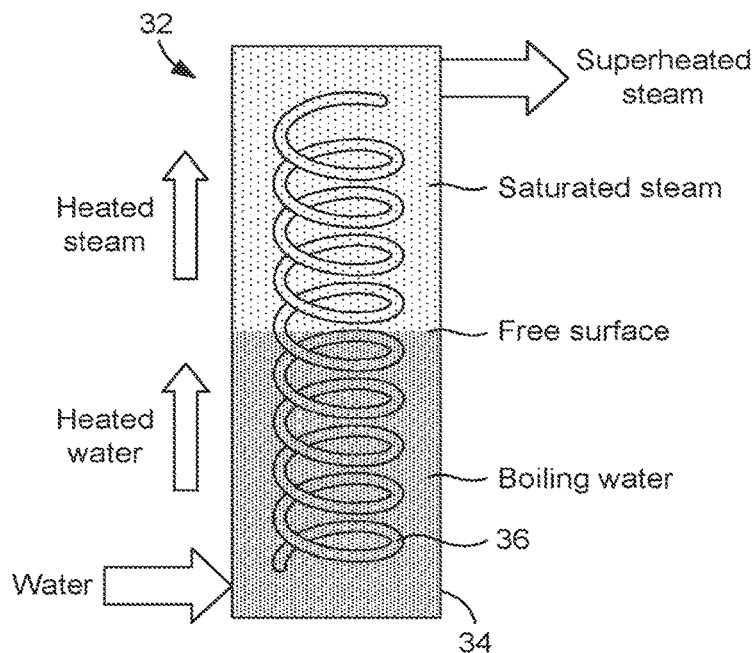
FIG. 3 is a schematic diagram of an electric heater that was used in the system of FIG. 2.
Figure 7:
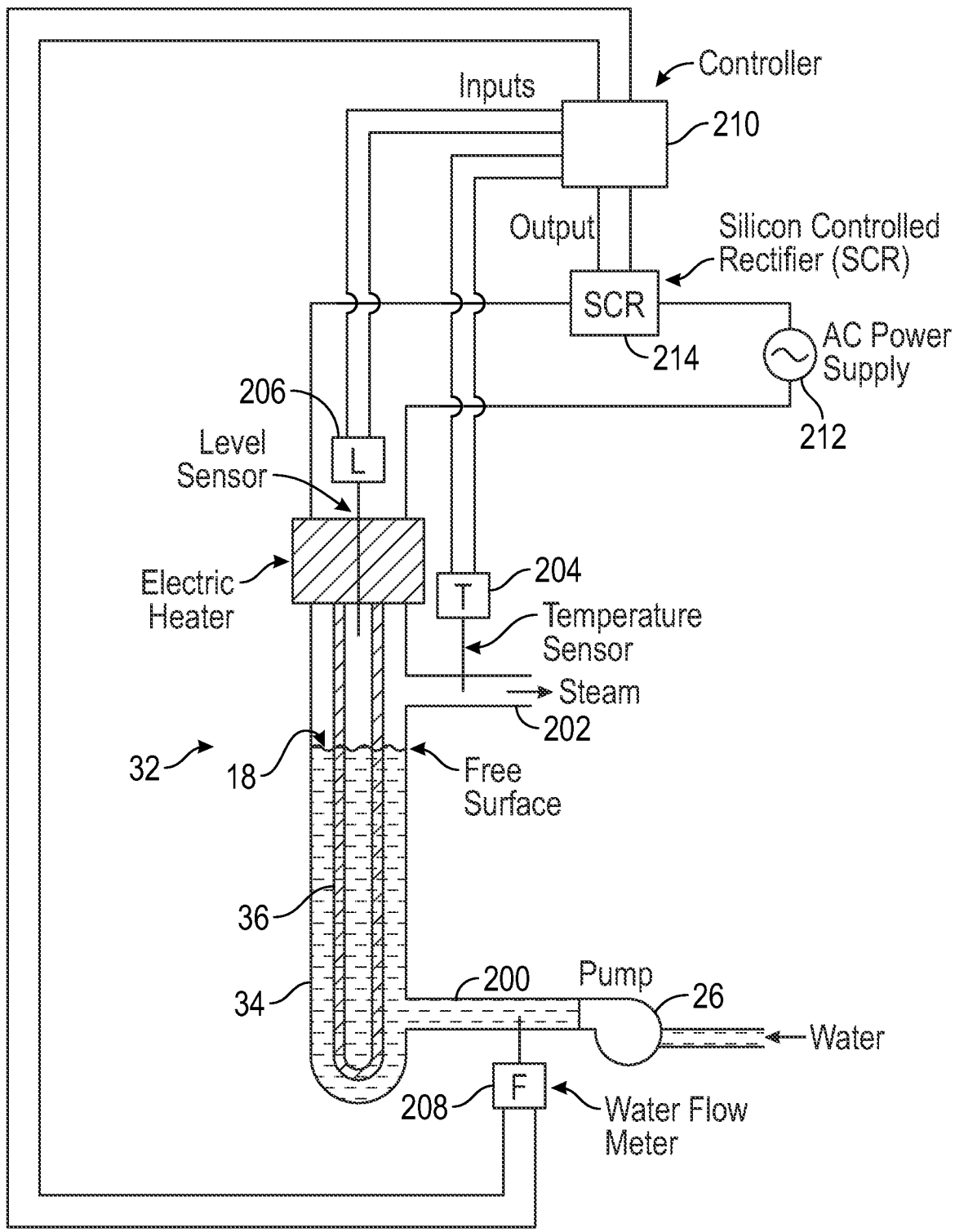
FIG. 7 is a schematic diagram of an electric heater for steam generation that may be used in the system of FIG. 2.

The system comprises a steam generation system comprising an electric heater 32, the water pump 26, and a control system comprising a controller 210 and a sensor. In a preferred embodiment, the sensor may be a temperature sensor 204 or a level sensor 206. The controller 210 is preferably a PID (proportional-integral-derivative) controller commonly utilized in industrial control systems. The electric heater 32 comprises a heating element 36 disposed vertically within a pressure vessel 34 so that the heating element 36 can provide heating within the vessel 34 vertically from a lower end of the vessel 34 to an upper end of the vessel 34, which is preferably a vertically oriented vessel constructed of stainless steel. The control system is configured to control a water level 18 in the pressure vessel 34. FIG. 3 illustrates a schematic diagram of a heater 32 having a coiled heating element 36. FIG. 7 illustrates a schematic diagram of a heater 32 having a U-shaped heating element 36. FIG. 7 also illustrates components of the control system for generating steam using the electric heater 32. Either configuration of the heater 32 may be utilized with the system shown in FIG. 2. The water pump 26 is preferably a positive displacement pump, which may preferably be a diaphragm pump.

To produce steam utilizing the prototype system 20 shown in FIG. 2, deionized water was provided at room temperature to the positive displacement pump 26, which precisely controlled the volume of water input into the system 10. The pump 26 outputs a defined, known volume of water with each pump cycle, which allows for accurate control of the water discharge rate from the pump. The deionized water was pumped to the electric heater 32 that heated the water to produce superheated steam. Water is continuously discharged from the pump 26, and the water flow rate from the pump 26 to the vessel 34 may be controlled by setting the pump 26 at a constant speed to produce a desired flow rate.

Steam is generated using the electric heater 32 by operating the water pump 26 to continuously pump water into a bottom end of the pressure vessel 34 through a water inlet line 200, as best seen in FIG. 7. Power is then supplied to the heating element 36 to heat the water until a stable free surface is formed that separates the liquid water phase (boiling water) from the gas phase (saturated steam) of the water within the pressure vessel 34. Steam is then output from the pressure vessel 34 through an overhead steam outlet line 202. The height of the free surface inside the vessel 34 depends on the water flow rate and the power delivered to the heating element 36. The saturated steam produced by boiling within the heater 32 may be further heated by the heating element 36, resulting in superheated steam. As the power is increased, the length of the heating element 36 that is exposed may increase resulting in higher steam temperatures.

The rate of steam generation from the pressure vessel 34 may be controlled by controlling the water level 18 in the pressure vessel 34, which may be controlled by adjusting the power supplied to the heating element 36 from a power supply 212. In a preferred embodiment, the power supply 212 is an AC (alternating current) power supply, and a silicon controlled rectifier (SCR) 214 is utilized to regulate the current to the heating element 36. The steam may be superheated by a portion of the vertical heating element 36 that is disposed above the free surface 18 within the pressure vessel 34. The steam output from the pressure vessel 34 is then mixed with the fuel gas, which is delivered at a controlled flow rate, to produce humidified fuel having a controlled ratio of steam to fuel. The fuel gas flow rate may be controlled by the mass flow controller 28.

In a preferred embodiment, as shown in FIG. 7, the sensor is a temperature sensor 204 positioned to measure a steam temperature of the steam output from the pressure vessel 34. The temperature sensor 204 may be installed on the steam outlet line 202. The controller 210 is configured to receive input from the temperature sensor 204 and, based on the input, to maintain the steam temperature at a setpoint by adjusting the power supplied to the heating element 36. The setpoint for the steam temperature may be input by a user to produce a desired steam flow rate that will result in a desired humidity level of the humidified fuel. By maintaining a constant output steam temperature, the water level 18 in the vessel 34 may be controlled because a lower water level 18 exposes more of the heating element 36, which would superheat the steam to a higher temperature, whereas a higher water level 18 leaves less of the heating element 36 exposed, which would result in lower temperature steam, which may be at or near saturation. Thus, maintaining a constant steam temperature may also maintain a constant water level 18. The humidity level of the fuel is also based on the flow rate of fuel gas, which may also be set by the user to a desired flow rate.

Alternatively, the sensor may be a level sensor 206 positioned to measure the water level 18 within the pressure vessel 34. In this embodiment, the controller 210 is configured to receive input from the level sensor 206 and, based on the input, to maintain the water level 18 in the pressure vessel 34 at a setpoint by adjusting the power supplied to the heating element 36. In this case, the water level 18 is measured directly and may be used as feedback to the controller 210. By adjusting the heater power to maintain a given water level 18, the rate of steam generation will match the rate at which the liquid water enters the bottom of the heater 32. The temperature of the steam can then be controlled by establishing the level of the water relative to the heating element 36. A completely immersed heating element 36 would result in saturated steam, while a partially exposed element would result in some degree of superheated steam.

In trial runs, the steam generation system shown in FIG. 7 was utilized with the prototype system 20 shown in FIG. 2 to produce syngas with humidified natural gas and oxygen gas inputs to the reactor 10. The controller 210 was used to adjust the heater power as needed to achieve a desired outlet steam temperature for a given water flow rate. This was performed in a closed loop fashion using the outlet steam temperature as feedback. The controller utilized a table to determine the minimum power required to bring incoming water at a known flow rate and known inlet temperature to boiling to set the minimum allowable power. The power can be increased by the controller 210 beyond this minimum value in order to reach the desired steam temperature. The values in the table were calculated a priori using the known heat capacity of water and known heat losses from the heater.

The following formula was utilized to produce Table 2 shown below, which shows the minimum required heater power:

$$\% \text{ heater power} = \frac{\dot{m}(h_L + C\Delta T) + \dot{Q}_{loss}}{\dot{Q}_{max}}$$

where
$\dot{m}$=mass flow rate of the water
$h_L$=latent heat of vaporization water
C=specific heat capacity of water
ΔT=boiling temperature of water-temperature of water entering the boiler
$\dot{Q}_{loss}$=heat loss through the boiler wall
$\dot{Q}_{max}$=maximum heater power

TABLE 2

Minimum required heater power

| mass flow rate (lb/hr) | % heater Power |
|---|---|
| 0.5 | 0.13 |
| 1 | 0.21 |
| 1.5 | 0.29 |
| 2 | 0.37 |
| 2.5 | 0.45 |
| 3 | 0.53 |
| 3.5 | 0.61 |
| 4 | 0.68 |
| 4.5 | 0.76 |
| 5 | 0.84 |
| 5.5 | 0.92 |

Thus, as the mass water flow rate is adjusted to a desired flow rate, the controller may be utilized to set a minimum power required to bring incoming water at a known flow rate and known inlet temperature to boiling, which is a lower limit set by the controller 210. The power supplied to the heating element 36 may then be increased by the controller 210 beyond this minimum value in order to reach the desired steam temperature. For the trial runs, the heater 32 utilized had a maximum power of 2 kW, and deionized water was supplied at 20 degrees Celsius. For the particular heater 32 utilized, the heat loss from the heater was calculated to be 105W of heat loss. This value was calculated experimentally by slowly increasing the power to the heater 32 until water in the heater began to boil. To produce saturated steam, the power supply may be set to the minimum heater power values shown in Table 2. To produce superheated steam, the PID controller 210 may be programmed to adjust the power to higher power levels to maintain a temperature or water level setpoint based on feedback from the temperature sensor 204 or level sensor 206. Although FIG. 7 illustrates a system having both temperature and level sensors, only one is preferably utilized for feedback at any given time.

In alternative embodiments, the required power can be experimentally determined by measuring the amount of heat power required to bring water to boiling at different inlet flow rates and inlet water temperatures.

The system preferably also includes a water flow meter 208 that also provides input to the controller 210, which allows the controller to determine the minimum required heater power from Table 2 based on the mass flow rate of water. By controlling the water flow at a constant rate and controlling the water level 18 at a constant level, the rate of steam generation will precisely match the input water flow rate, which thus allows for precise control of the steam flow rate by controlling the input water flow rate. For this reason, the water pump 26 is preferably a positive displacement pump, as this type of pump is generally capable of producing a consistently accurate flow rate at a given pump speed (rpm) regardless of the back pressure on the pump, which may fluctuate during operation. Other types of pumps, such as a centrifugal pump, may thus experience fluctuations in the discharge flow rate, which may thus cause undesirable fluctuations in the rate of steam generation. Other such types of pumps may be utilized, but may require additional controls to maintain a consistently accurate discharge flow rate in order to provide the same precision of control of the steam flow rate provided by a positive displacement pump.

With reference back to FIG. 2, the natural gas from the mass flow controller 30 and the superheated steam from the electric heater 32 were supplied to and mixed within a static mixer 38 positioned upstream of a reactor (reformer), which comprised a burner 40, a combustion chamber 42, and a catalyst chamber 44. The temperature of the superheated steam was set such that the temperature of the mixture at the outlet of the static mixer 38 was above the dew point but below the boiling point (e.g., 100° C.) of water. The catalyst chamber 44 is coupled to the combustion chamber 42, and the combustion reactants from the combustion chamber 42 react with a catalyst contained within the catalyst chamber to generate a gas mixture of hydrogen, carbon monoxide, unreacted methane, carbon dioxide, and water.

The humidified natural gas output from the static mixer 38 was delivered to the burner 40. The burner comprised a ¼ in. diameter tube concentrically positioned within a ⅜ in. diameter tube. Both tubes were made from 316 stainless steel. A catalyst comprising approximately 7% to 9% Ni placed on an alumina-silica support was used in the catalyst chamber 44 of the reactor. Syngas exiting the catalyst chamber 44 was then delivered to a water-cooled, tube-and-shell heat exchanger 46 that reduced the syngas temperature to room temperature. A gas analyzer (not shown) was then used to measure the molar composition of the dry syngas. Experiments were performed with and without the catalyst bed and for different ratios of water to fuel. The water produced by the reactions was calculated by mass balance.

Table 3 shows results for three runs in the system 20 having constant natural gas and oxygen gas inputs and varying steam inputs. The results show molar outputs from the combustion chamber 42 and from the catalyst chamber 44 that is coupled to the combustion chamber, although combustion chamber data was not obtained for Run No. 3. The results in Table 3 show the partial oxidation reaction occurring in the combustion chamber 42 alone produced syngas with a molar ratio of approximately 1.5:1, and more specifically between 1.45:1 and 1.5:1. This ratio increased somewhat as the water-to-fuel ratio increased. The amount of $CO_2$ and $CH_4$ at the outlet of the combustion chamber also increased as the water-to-fuel ratio increased. The syngas molar ratio increased further after the gas mixture passed through the catalyst chamber 44. Table 3 shows a syngas molar ratio between 1.9:1 and 2.8:1 at the outlet of the catalyst bed, depending on the water-to-fuel ratio. Also shown in Table 3 are the mole fractions of the feedstock and products in the combustion chamber 42 and after passage over the catalyst bed within the catalyst chamber 44. Little change was observed in the $CO_2$ and $CH_4$ mole fraction between different water-to-fuel ratios. The percentage of fuel consumed by the reaction (Table 4) was also observed to be invariant with water-to-fuel ratio. However, higher water-to-fuel ratios resulted in greater fuel consumption in the catalyst bed and less consumption during the partial oxidation.

the syngas relative to partial oxidation at higher water-to-fuel ratios as well. Interestingly, the data shows the majority of $CO_2$ production occurs at partial oxidation.

TABLE 5

Fractions of products for each reaction.

| Water to Fuel Ratio | Fraction of Products Produced by Reaction (%) | | | | | | |
|---|---|---|---|---|---|---|---|
| | Partial Oxidation | | | Water Gas Shift | | Steam Methane Reforming | |
| | $CO_2$ | CO | $H_2$ | $CO_2$ | $H_2$ | CO | $H_2$ |
| 0.34 | 85 | 70 | 54 | 15 | 2 | 30 | 44 |
| 0.19 | 95 | 73 | 57 | 5 | 1 | 27 | 42 |

Overall, the results indicate that the humidity level of the fuel (e.g., natural gas) controls the $H_2$:CO molar ratio, the

TABLE 3

Molar flow rates and mole fractions for different water to fuel input ratios

| | Inputs | | | Combustion chamber output | | | | | | Catalyst bed output | | | | | |
|---|---|---|---|---|---|---|---|---|---|---|---|---|---|---|---|
| | (mol/hr) | | | (mol/hr) | | | | | (mol/mol) | (mol/hr) | | | | | (mol/mol) |
| Run | NG | $O_2$ | $H_2O$ | $CO_2$ | CO | $H_2$ | $CH_4$ | $H_2O$ | $H_2$:CO | $CO_2$ | CO | $H_2$ | $CH_4$ | $H_2O$ | $H_2$:CO |
| 1 | 72 | 48 | 25 | 10 | 38 | 57 | 26 | 63 | 1.5 | 12 | 52 | 104 | 11 | 46 | 2.0 |
| 2 | 72 | 48 | 13 | 9 | 40 | 58 | 25 | 50 | 1.5 | 10 | 54 | 102 | 11 | 35 | 1.9 |
| 3 | 72 | 48 | 78 | N/A | N/A | N/A | N/A | N/A | N/A | 23 | 42 | 118 | 11 | 87 | 2.8 |
| 1 | 0.5 | 0.33 | 0.17 | 0.05 | 0.20 | 0.29 | 0.13 | 0.32 | 1.5 | 0.05 | 0.23 | 0.46 | 0.05 | 0.20 | 2.0 |
| 2 | 0.54 | 0.36 | 0.10 | 0.05 | 0.22 | 0.32 | 0.14 | 0.27 | 1.5 | 0.05 | 0.25 | 0.48 | 0.05 | 0.17 | 1.9 |
| 3 | 0.36 | 0.24 | 0.39 | N/A | N/A | N/A | N/A | N/A | N/A | 0.08 | 0.15 | 0.42 | 0.04 | 0.31 | 2.8 |

TABLE 4

Fraction of fuel consumed by each stage

| Fuel to Water Ratio | Fuel Consumed (%) | | |
|---|---|---|---|
| | Combustion | Catalyst | Total |
| 2.9 | 64 | 21 | 85 |
| 5.4 | 65 | 20 | 85 |

The overall process performed by the system 20 can be described as a partial oxidation reaction in series with chemical reactions occurring in the catalyst bed. The results show the impact of the water-to-fuel ratio on the partial oxidation reaction, resulting in increased $H_2$:CO molar ratios, increased $CO_2$, and increased $CH_4$ as the water is increased.

The chemistry in the catalyst bed can be interpreted as a set of competing chemical reactions:

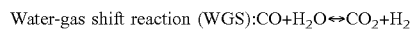
Water-gas shift reaction (WGS):$CO+H_2O \leftrightarrow CO_2+H_2$

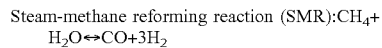
Steam-methane reforming reaction (SMR):$CH_4+ H_2O \leftrightarrow CO+3H_2$ Taking the output of the combustion chamber 42 as input to the above equations leads to a prediction of the catalyst chamber outlet composition that is within 3% of the measured values.

Table 5 shows the breakdown of the gas products as a function of each reaction. The results show the WGS reaction has a low overall contribution to the $H_2$ production, although this contribution increases as the water-to-fuel ratio increases. The SMR reaction produces a larger fraction of $CH_4$ content, and the $CO_2$ content. Therefore, precise control over the syngas molar ratio can be achieved with precise control over water (steam) and fuel flow rates.

The data shown in Table 3 was generated using a prototype system. A larger commercial-scale system was also constructed with a combustion chamber but without the catalyst chamber. This system was utilized to generate similar data, which is summarized in Table 6 below.

TABLE 6 mole fractions for different water to fuel input ratios

| | Inputs | | | Combustion chamber output | | | | |
|---|---|---|---|---|---|---|---|---|
| | Mscf/hr | | lb/hr | (mol/mol) | | | | (mol/mol) |
| Case | NG | $O_2$ | $H_2O$ | $CO_2$ | CO | $H_2$ | $CH_4$ | $H_2$:CO |
| 1 | 33 | 18 | 759 | 8.6 | 25.5 | 53.1 | 12.8 | 2.08 |
| 2 | 34 | 19 | 444 | 7.9 | 27.8 | 55.4 | 8.5 | 1.99 |
| 3 | 33 | 18 | 0 | 4.5 | 30.7 | 56.6 | 7.4 | 1.84 |

Table 6 shows the molar ratio of hydrogen to carbon monoxide from the combustion chamber at varying steam levels for three trial runs. The results shown in Table 6 further indicate that the humidity level of the fuel provides accurate control of the syngas molar ratio. In addition, the results shown in Table 6 indicate a higher degree of variability in the syngas molar ratios from the combustion chamber compared to the results for Runs No. 1 and 2 shown in Table 3. This may be explained by the temperature achieved by the burner of the combustion chamber in the two different systems. The prototype system 20 utilized a burner at a temperature of approximately 500 degrees Celsius, while the commercial burner operated at approximately 1100 degrees Celsius. Thus, the results shown in Table 6 indicate that precisely controlling the humidity of the fuel gas may provide precise control of the syngas molar ratios achieved with only a combustion chamber, as well as with a catalyst chamber coupled to the combustion chamber.

Figure 4:
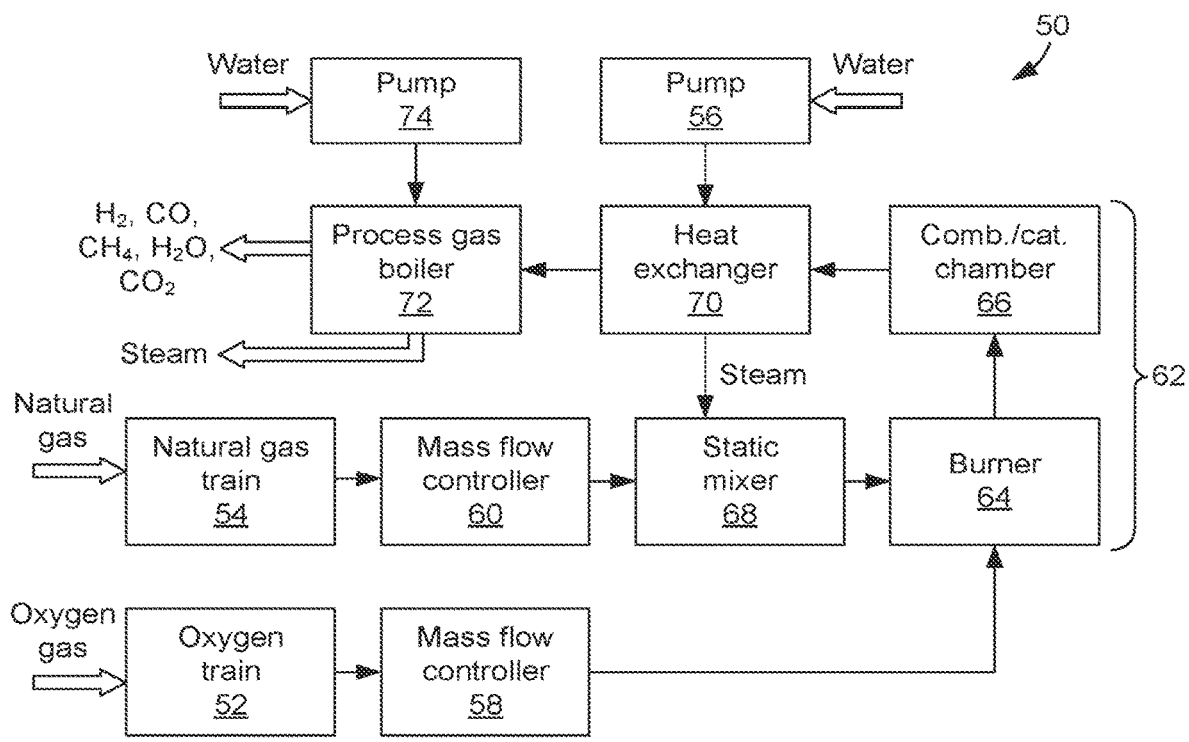
FIG. 4 is a schematic diagram of an embodiment of a first commercial-scale system for producing syngas.

FIG. 4 schematically illustrates another commercial-scale system 50 for producing syngas. The system 50 is designed to generate approximately 7,000 to 8,000 lb/hr of syngas having an $H_2$:CO molar ratio of approximately 2:1.

As shown in FIG. 4, the system 50, like the system 20, comprises an oxygen train 52 that receives oxygen gas, a natural gas train 54 that receives natural gas, and a first pump 56 that receives water. The first pump 56 can, for instance, comprise a positive displacement pump, such as a diaphragm pump. By way of example, oxygen can be supplied to the oxygen train 52 at a rate of 3,381 lb/hr and 37,912 scfh, natural gas can be supplied to the natural gas train 54 at a rate of 3,382 lb/hr and 67,700 scfh, and water is provided to the first pump 56 at a rate of 500 to 1,000 lb/hr (59-120 gph) at a temperature of 77° F. and 0 psig. Downstream of both the oxygen train 52 and the natural gas train 54 are separate mass flow controllers 58 and 60 that respectively control the flow of oxygen gas and natural gas to the remainder of the system 50. By way of example, the oxygen gas and natural gas can be provided to their respective mass flow controllers 58, 60 at 50 psig and the mass flow controllers can output the oxygen and natural gas at 6 psig and 10 psig, respectively.

Figure 8:
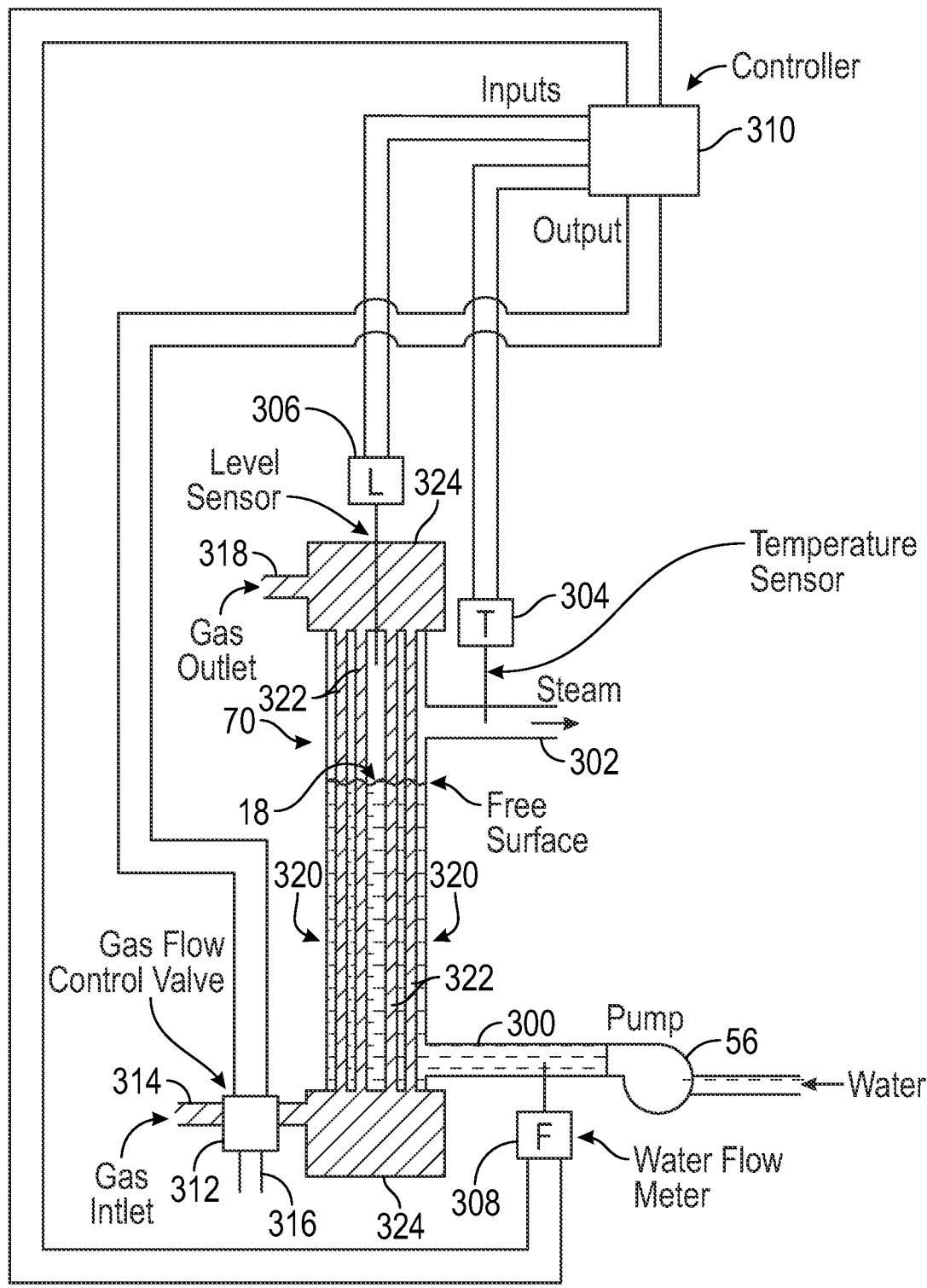
FIG. 8 is a schematic diagram of a heat exchanger for steam generation that may be used in the system of FIG. 4.

In a preferred embodiment, the system 50 includes a heat exchanger 70 that is utilized to generate the steam required to produce humidified fuel gas. FIG. 8 illustrates the heat exchanger in detail. The heat exchanger 70 preferably comprises a vertically oriented shell 320 and a plurality of tubes 322 disposed within the shell. The tubes 322 are preferably disposed in a vertical position within the shell 320 and are not in fluid communication with an interior of the shell 320. Similar to the electric heater 32 shown in FIG. 7, the steam generation system shown in FIG. 8 also comprises a water pump 56, which is preferably a positive displacement pump, and a control system comprising a controller 310 and a sensor, which may preferably be a temperature sensor 304 or a level sensor 306. In this embodiment, the control system is also configured to control a water level 18 within the shell 320 of the heat exchanger 70. Steam may be generated using the heat exchanger by operating the water pump 56 to continuously pump water into a bottom end of the shell 320 through a water inlet line 300, flowing a heated fluid through the tubes 322 of the heat exchanger 70 such that a free surface is formed within the shell 320 between a liquid water phase and a saturated steam phase, and outputting steam from the shell 320 through an overhead steam line 302. The rate of steam generation from the heat exchanger 70 may be controlled by controlling the water level 18 in the shell 320, which may be controlled by adjusting the flow rate of the heated fluid through the tubes 322 of the heat exchanger.

Thus, the heat exchanger 70 functions in a similar manner as the electric heater 32 but utilizes a process fluid to exchange heat to generate steam rather than utilizing heating elements 36. The inputs to the controller 310 are also preferably temperature sensor 304 or level sensor 306 feedback, but the controller 310 output is configured to control a flow control valve 312 that regulates the flow of the heated process fluid into the tubes 322 of the exchanger. The controller 310 may also receive inputs from the water flow meter 308 to determine a minimum flow of heated fluid to maintain steam production. The controller 310 may then increase the heated fluid flow based on input form a sensor 304, 306 to maintain the water level 18 in the heat exchanger shell 320.

In a preferred embodiment, the process fluid utilized to boil the water comprises the synthesis gas produced within the reactor 62. Thus, waste heat from the process may be utilized to generate the steam required to produce the humidified fuel. The heated process fluid may flow into a lower head 324 of the exchanger 70 through a gas inlet line 314, upward through the tubes 322, and out of a gas outlet line 318 on an upper head 324 of the exchanger at a lower temperature. In a preferred embodiment, the flow control valve 312 is a three-way proportional control valve that allows a portion of the hot syngas flow to be directed to the heat exchanger while the remaining syngas flow is directed to an output line 316, which may direct the flow to a separate boiler 72 or another piece of process equipment. The steam output from the heat exchanger 70 is then mixed with the fuel gas, which is delivered at a controlled flow rate, to produce humidified fuel having a controlled ratio of steam to fuel for combustion in the reactor.

As noted above, the amount of water provided to the reactor of a syngas production system is critical in controlling the $H_2$:CO molar ratio of the resulting syngas. This amount can be more precisely controlled using the pump 56 than by using a mass flow controller or other flow control mechanism. The water input into the first pump 56 is delivered by the pump to the heat exchanger 70 through which the high-temperature syngas produced by the reactor 62 also passes. In some embodiments, the heat exchanger 70 comprises metal pipes arranged vertically and perpendicular to the hot exhaust stream through which the water passes. The heat exchanger 70 heats the water to transform it into superheated steam that is delivered to a static mixer 68. By way of example, the steam can have a temperature greater than 600° F., a pressure of 10 psig, and a flow rate of 260 to 407 cfm.

Also like the system 20, the system 50 includes a reactor (reformer) 62 that comprises a burner 64 as well as a combustion chamber and catalyst chamber, which are together identified with reference numeral 66. Oxygen gas from the mass flow controller 58 is delivered to the burner 64 of the reactor 62. The natural gas from the mass flow controller 60, however, is delivered to the static mixer 68, in which the natural gas is mixed with the superheated steam to produce humidified natural gas that can then be input into the burner 64. By way of example, the humidified natural gas can be delivered to the burner at a pressure of 6 psig.

In some embodiments, the static mixer 68 comprises a straight pipe packed with structured mixing elements. Such a device enables continuous mixing of steam and natural gas and utilizes the energy of the flow to achieve a high degree of blending. By way of example, the static mixer 68 may comprise two mixing elements each 15 inches in length that experience approximately 4 psi of pressure drop at a combined natural gas and steam flow rate of approximately 4,400 lb/hr. This humidified natural gas can have a water-to-fuel mass ratio of approximately 1:10 to 1:1.5 and a temperature that is greater than the dew point but less than the boiling point (e.g., 100° C.) of water.

Syngas is produced by the reactor 62 that is output to the heat exchanger 70, as mentioned above. By way of example, the syngas can be output at 1818° F. and 0.6 psig. The syngas that exits the heat exchanger 70 (e.g., at 1,652° F. and 0.5 psig) can be passed through a process gas boiler 72 that is used both to further decrease the temperature of the syngas and to generate steam from the waste heat of the system 50. Water for this steam production can be provided to the process gas boiler 72 using a second pump 74, which can also comprise a positive displacement pump. By way of example, the water can be provided to the second pump 74 at a rate of 9,148 to 9,777 lb/hr at 77° F. and 0 psig. The process gas boiler 72 can output syngas at 7,263 to 7,762 lb/hr, 86° F., and 0 psig, and can output steam at 9,148 to 9,777 lb/hr, 915° F., and 765 psia.

Figure 5:
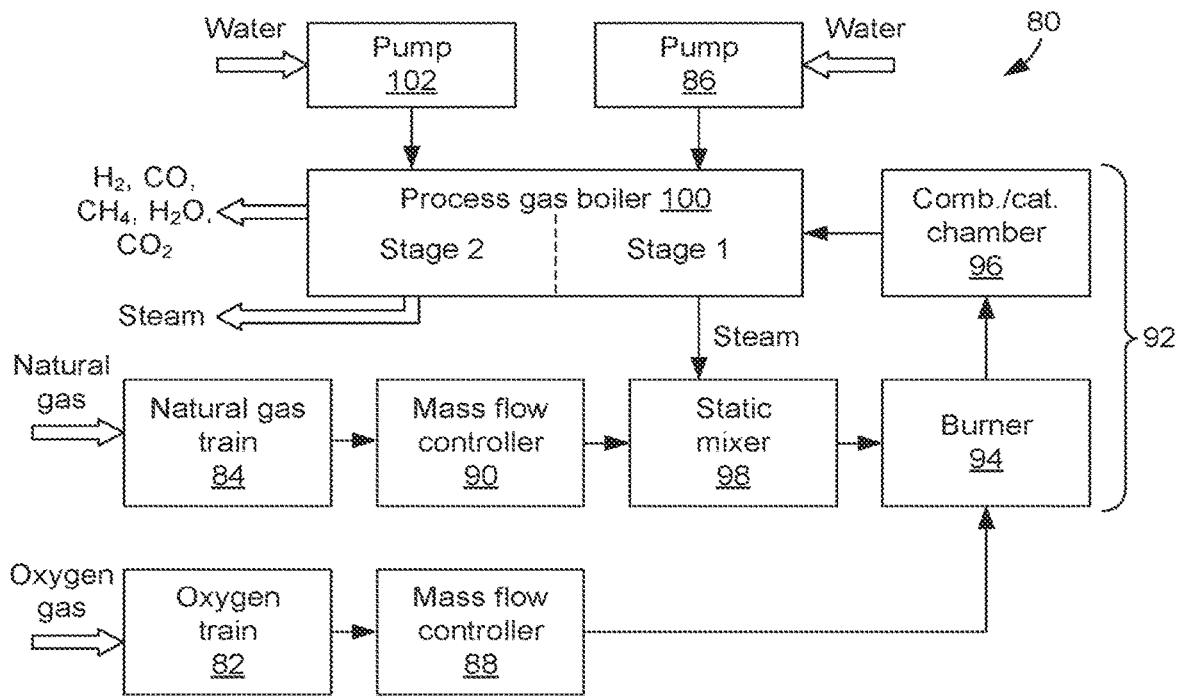
FIG. 5 is a schematic diagram of an embodiment of a second commercial-scale system for producing syngas.

FIG. 5 illustrates a further commercial-scale system 80 for producing syngas. This system 80 is similar in many ways to the system 50 described in relation to FIG. 4. As shown in FIG. 5, the system 80 comprises an oxygen train 82 that receives oxygen gas, a natural gas train 84 that receives natural gas, and a first pump 86 that receives water. By way of example, oxygen can be supplied to the oxygen train 82 at a rate of 3,381 lb/hr and 37,912 scfh, natural gas can be supplied to the natural gas train 84 at a rate of 3,382 lb/hr and 67,700 scfh, and water can be provided to the first pump 86 at a rate of 500 to 1,000 lb/hr (59-120 gph) at a temperature of 77° F. and 0 psig. Downstream of both the oxygen train 82 and the natural gas train 84 are separate mass flow controllers 88 and 90 that respectively control the flow of oxygen gas and natural gas to the remainder of the system 80. By way of example, the oxygen gas and natural gas can be provided to their respective mass flow controllers 88, 90 at 50 psig and the mass flow controllers can output the oxygen and natural gas at 6 psig and 10 psig, respectively.

The water input into the first pump 86 is delivered by the pump to a first stage of a process gas boiler 100 through which the high-temperature syngas produced by the reactor 92 also passes. This stage of the boiler 100 functions to exchange heat between the syngas and the water and, therefore, the boiler may also be considered and referred to as a heat exchanger. The process gas boiler 100 heats the water to transform it into superheated steam that is delivered to a static mixer 98. By way of example, the steam can have a temperature greater than 600° F., a pressure of 10 psig, and a flow rate of 260 to 407 cfm.

Thus, in this system 80, the steam generation system comprises a boiler 100 and a water pump 86. Steam may be generated using the boiler 100 by operating the water pump 86 to continuously pump water to the boiler 100, boiling the water in the boiler to generate steam, and outputting the steam from the boiler 100. The rate of steam generation from the boiler 100 may be controlled by controlling a water flow rate continuously discharged from the pump 86 to the boiler. The water pump 86 is preferably a positive displacement pump, and the water flow rate may be controlled at a constant rate by adjusting the speed of the pump 86. The steam output from the boiler 100 may then be mixed with fuel gas delivered at a controlled flow rate to produce humidified fuel having a controlled ratio of steam to fuel. The humidified fuel and oxygen may then be combusted in the reactor 92. In this embodiment, preferably all of the water pumped to the boiler 100 is vaporized to generate steam. Thus, the steam flow rate may be controlled by only controlling the water flow rate from the pump 86. The positive displacement pump 86 continuously cycles during operation and outputs a defined volume of water with each cycle, so the step of controlling the water flow rate continuously discharged from the pump 86 to the boiler 100 may comprise setting the pump at a constant speed. In a preferred embodiment, the boiler 100 utilizes syngas produced within the reactor 92 to boil the water discharged form the water pump 86 to generate the steam. An additional heater 134 may optionally be utilized downstream of the boiler to superheat the steam, as discussed below in relation to FIG. 6.

The system 80 further includes a reactor (reformer) 92 that comprises a burner 94 as well as a combustion chamber and catalyst chamber, which are together identified with reference numeral 96. Oxygen gas from the mass flow controller 88 is delivered directly to the burner 94 of the reactor 92. The natural gas from the mass flow controller 90, however, is delivered to the static mixer 98, in which the natural gas is mixed with the superheated steam to produce humidified natural gas that can then be input into the burner 94. By way of example, the humidified natural gas can be delivered to the burner at a pressure of 6 psig.

Syngas produced by the reactor 92 is output to the process gas boiler 100, as mentioned above. By way of example, the syngas can be output at 1818° F. and 0.6 psig. The syngas passes through the first stage and a second stage of the process gas boiler 100, which outputs the cooled syngas and steam. Water for this steam is provided to the second stage of the process gas boiler 100 using a second pump 102, which can also comprise a positive displacement pump. By way of example, the water can be provided to the second pump 102 at a rate of 9,148 to 9,777 lb/hr at 77° F. and 0 psig. By way of example, the syngas is output at 7,263 to 7,762 lb/hr, 86° F., and 0 psig, and the steam is output at 9,148 to 9,777 lb/hr, 915° F., and 765 psia.

Figure 6:
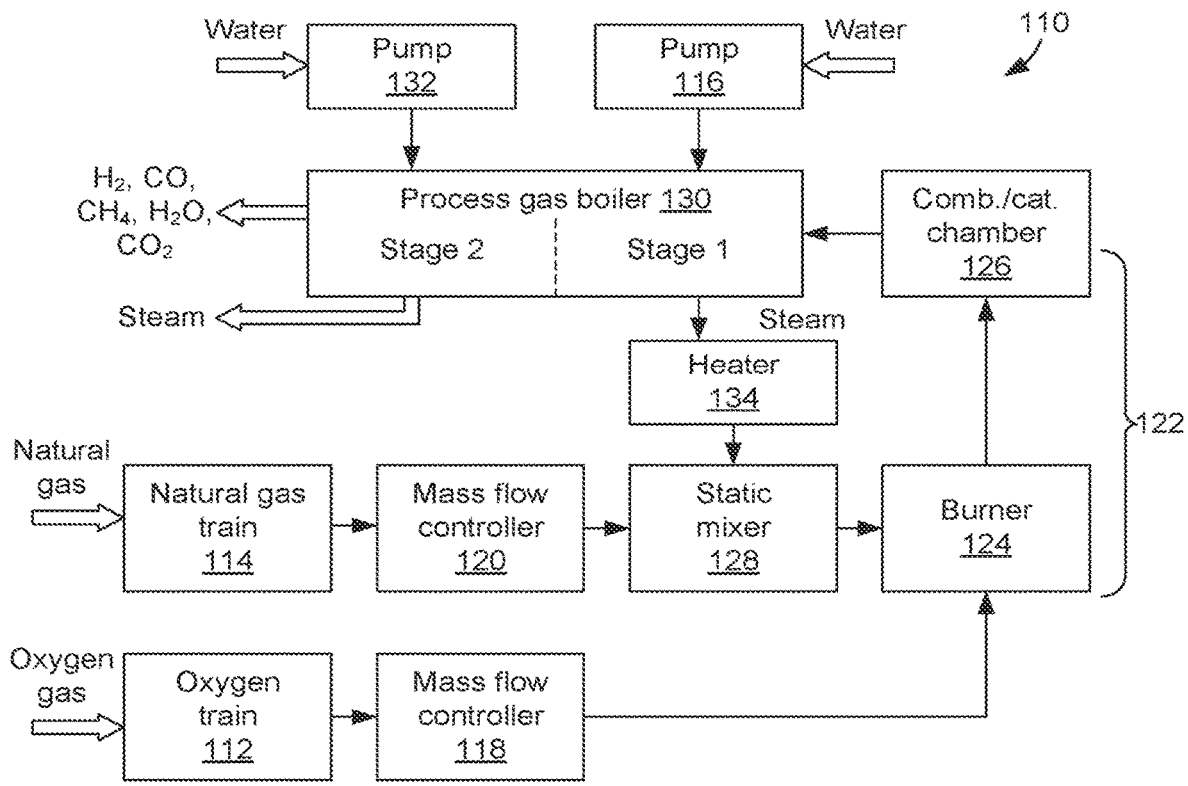
FIG. 6 is a schematic diagram of an embodiment of a third commercial-scale system for producing syngas.

FIG. 6 illustrates yet another commercial-scale system 110 for producing syngas. This system 110 is identical to the system 80 of FIG. 5, except the latter system further includes an electric heater 134 that receives steam at a first temperature and heats the steam to a second temperature prior to it being delivered to the static mixer 128. By way of example, the heater 134 can receive steam at 239° F. and raise its temperature to above 600° F. This superheated steam can then be provided to the mixer 128 at 10 psig and 260 to 407 cfm.

Like the system 80 shown in FIG. 5, the system 110 also comprises an oxygen train 112 that receives oxygen gas, a natural gas train 114 that receives natural gas, and a first pump 116 that receives water. Downstream of both the oxygen train 112 and the natural gas train 114 are separate mass flow controllers 118 and 120 that respectively control the flow of oxygen gas and natural gas to the remainder of the system 110. The water input into the first pump 116 is delivered by the pump to a first stage of a process gas boiler 130 through which the high-temperature syngas produced by the reactor 122 also passes. This stage of the boiler 130 functions to exchange heat between the syngas and the water and, therefore, the boiler may also be considered and referred to as a heat exchanger. The process gas boiler 130 heats the water to transform it into superheated steam that is delivered to the static mixer 128.

The system 110 further includes a reactor (reformer) 122 that comprises a burner 124 as well as a combustion chamber and catalyst chamber, which are together identified with reference numeral 126. Oxygen gas from the mass flow controller 118 is delivered directly to the burner 124 of the reactor 122. The natural gas from the mass flow controller 120, however, is delivered to the static mixer 118, in which the natural gas is mixed with the superheated steam to produce humidified natural gas that can then be input into the burner 124. Syngas produced by the reactor 122 is output to the process gas boiler 130, as mentioned above. The syngas passes through the first stage and a second stage of the process gas boiler 130, which outputs the cooled syngas and steam. Water for this steam is provided to the second stage of the process gas boiler 130 using a second pump 132, which can also comprise a positive displacement pump.

What is claimed is:

1. A method for producing synthesis gas, said method comprising the steps of:
    providing a reactor comprising a combustion chamber;
    providing a steam generation system comprising an electric heater, a water pump, and a control system comprising a controller and a sensor, wherein the electric heater comprises a heating element disposed vertically within a pressure vessel, wherein the control system is configured to control a water level in the pressure vessel;
    generating steam using the electric heater, wherein the step of generating steam comprises: operating the water pump to continuously pump water into a bottom end of the pressure vessel, supplying power to the heating element such that a free surface is formed within the pressure vessel between a liquid water phase and a saturated steam phase, and outputting steam from the pressure vessel;
    controlling a rate of steam generation from the pressure vessel by controlling the water level within the pressure vessel, wherein the water level is controlled by adjusting the power supplied to the heating element;
    mixing the steam output from the pressure vessel with a fuel gas delivered at a controlled flow rate to produce humidified fuel having a controlled ratio of steam to fuel;
    delivering the humidified fuel and oxygen gas to the combustion chamber of the reactor; and
    combusting the humidified fuel and oxygen to produce synthesis gas comprising hydrogen and carbon monoxide within the reactor.

2. The method of claim 1, wherein the water pump is a positive displacement pump.

3. The method of claim 1, wherein the sensor is a temperature sensor positioned to measure a steam temperature of the steam output from the pressure vessel, wherein the controller is configured to receive input from the temperature sensor and, based on the input, to maintain the steam temperature at a setpoint by adjusting the power supplied to the heating element, thereby controlling the water level in the pressure vessel.

4. The method of claim 1, wherein the sensor is a level sensor positioned to measure the water level within the pressure vessel, wherein the controller is configured to receive input from the level sensor and, based on the input, to maintain the water level in the pressure vessel at a setpoint by adjusting the power supplied to the heating element.

5. The method of claim 1, wherein the humidified fuel is at a temperature greater than the dew point of water but less than the boiling point of water.

6. The method of claim 1, wherein the reactor further comprises a catalyst chamber coupled to the combustion chamber, wherein combustion reactants from the combustion chamber react with a catalyst contained within the catalyst chamber to generate a gas mixture of hydrogen, carbon monoxide, unreacted methane, carbon dioxide, and water.

7. The method of claim 6, wherein the catalyst chamber includes a catalyst comprising nickel on an alumina-silica support.

8. A method for producing synthesis gas, said method comprising the steps of:
    providing a reactor comprising a combustion chamber;
    providing a steam generation system comprising a heat exchanger, a water pump, and a control system comprising a controller and a sensor, wherein the heat exchanger comprises a vertically oriented shell and a plurality of tubes disposed within the shell, wherein the tubes are not in fluid communication with an interior of the shell, wherein the control system is configured to control a water level in the shell of the heat exchanger;
    generating steam using the heat exchanger, wherein the step of generating steam comprises: operating the water pump to continuously pump water into a bottom end of the shell of the heat exchanger, flowing a heated fluid through the tubes of the heat exchanger such that a free surface is formed within the shell between a liquid water phase and a saturated steam phase, and outputting steam from the shell of the heat exchanger;
    controlling a rate of steam generation from the heat exchanger by controlling the water level within the shell, wherein the water level is controlled by adjusting a flow rate of the heated fluid through the tubes of the heat exchanger;
    mixing the steam output from the heat exchanger with a fuel gas delivered at a controlled flow rate to produce humidified fuel having a controlled ratio of steam to fuel;
    delivering the humidified fuel and oxygen gas to the combustion chamber of the reactor; and
    combusting the humidified fuel and oxygen to produce synthesis gas comprising hydrogen and carbon monoxide within the reactor.

9. The method of claim 8, wherein the heated fluid flowed through the tubes of the heat exchanger comprises the synthesis gas produced within the reactor.

10. The method of claim 8, wherein the tubes of the heat exchanger are disposed in a vertical position within the shell.

11. The method of claim 8, wherein the water pump is a positive displacement pump.

12. The method of claim 8, wherein the sensor is a temperature sensor positioned to measure a steam temperature of the steam output from the shell of the heat exchanger, wherein the controller is configured to receive input from the temperature sensor and, based on the input, to maintain the steam temperature at a setpoint by adjusting the flow rate of the heated fluid through the tubes of the heat exchanger, thereby controlling the water level in the shell of the heat exchanger.

13. The method of claim 8, wherein the sensor is a level sensor positioned to measure the water level in the shell of the heat exchanger, wherein the controller is configured to receive input from the level sensor and, based on the input, to maintain the water level in the shell at a setpoint by adjusting the flow rate of the heated fluid through the tubes of the heat exchanger.

14. The method of claim 8, wherein the humidified fuel is at a temperature greater than the dew point of water but less than the boiling point of water.

15. The method of claim 8, wherein the reactor further comprises a catalyst chamber coupled to the combustion chamber, wherein combustion reactants from the combustion chamber react with a catalyst contained within the catalyst chamber to generate a gas mixture of hydrogen, carbon monoxide, unreacted methane, carbon dioxide, and water.

16. A method for producing synthesis gas, said method comprising the steps of:
- providing a reactor comprising a combustion chamber;
- providing a steam generation system comprising a boiler and a water pump;
- generating steam using the boiler, wherein the step of generating steam comprises: operating the water pump to continuously pump water to the boiler, boiling the water in the boiler to generate steam, and outputting the steam from the boiler;
- controlling a rate of steam generation from the boiler by controlling a water flow rate continuously discharged from the pump to the boiler, wherein the water flow rate is controlled at a constant rate by adjusting a speed of the pump;
- mixing the steam output from the boiler with a fuel gas delivered at a controlled flow rate to produce humidified fuel having a controlled ratio of steam to fuel;
- delivering the humidified fuel and oxygen gas to the combustion chamber of the reactor; and
- combusting the humidified fuel and oxygen to produce synthesis gas comprising hydrogen and carbon monoxide within the reactor.

17. The method of claim 16, wherein the pump is a positive displacement pump that continuously cycles and that outputs a defined volume of water with each cycle, wherein the step of controlling the water flow rate continuously discharged from the pump to the boiler comprises setting the pump at a constant speed.

18. The method of claim 16, wherein boiler utilizes the synthesis gas produced within the reactor to boil the water discharged from the water pump to generate the steam.

19. The method of claim 16, wherein the humidified fuel is at a temperature greater than the dew point of water but less than the boiling point of water.

20. The method of claim 16, wherein the reactor further comprises a catalyst chamber coupled to the combustion chamber, wherein combustion reactants from the combustion chamber react with a catalyst contained within the catalyst chamber to generate a gas mixture of hydrogen, carbon monoxide, unreacted methane, carbon dioxide, and water.

* * * * *